(12) United States Patent
Pandey (10) Patent No.: US 8,209,598 B1
(45) Date of Patent: Jun. 26, 2012

(54) EXPORTING ELECTRONIC DOCUMENTS FROM RICH INTERNET APPLICATIONS

(75) Inventor: Aditya Kumar Pandey, New Delhi (IN)

(73) Assignee: Adobe Systems Incorporated, San Jose, CA (US)

(*) Notice: Subject to any disclaimer, the term of this patent is extended or adjusted under 35 U.S.C. 154(b) by 459 days.

(21) Appl. No.: 12/546,170

(22) Filed: Aug. 24, 2009

(51) Int. Cl.
*G06F 17/00* (2006.01)

(52) U.S. Cl. ....................................... 715/205

(58) Field of Classification Search .................. 715/201, 715/202, 203, 204, 205, 243
See application file for complete search history.

(56) References Cited

U.S. PATENT DOCUMENTS

| | | | |
|---|---|---|---|
| 5,778,367 A * | 7/1998 | Wesinger et al. ..................... | 1/1 |
| 6,154,754 A * | 11/2000 | Hsu et al. ....................... | 715/210 |
| 6,216,141 B1 * | 4/2001 | Straub et al. ................... | 715/234 |
| 7,275,096 B2 * | 9/2007 | Green ............................ | 709/223 |
| 7,876,668 B2 * | 1/2011 | Yoon et al. ................. | 369/275.4 |
| 7,895,578 B2 | 2/2011 | Tsai et al. | |
| 2007/0016696 A1 * | 1/2007 | Jerrard-Dunne et al. ..... | 709/250 |
| 2008/0215968 A1 | 9/2008 | Bekerman | |
| 2009/0150797 A1 | 6/2009 | Burkholder et al. | |
| 2009/0165140 A1 * | 6/2009 | Robinson et al. ............... | 726/26 |
| 2009/0307258 A1 * | 12/2009 | Priyadarshi et al. .......... | 707/102 |
| 2010/0070876 A1 * | 3/2010 | Jain et al. ....................... | 715/748 |
| 2010/0306366 A1 * | 12/2010 | Cragun et al. ................. | 709/224 |
| 2011/0026900 A1 | 2/2011 | Lussier et al. | |

OTHER PUBLICATIONS

Sun, Zan, et al, "Model-driven Web Transactions Under Contrained Modalities", WWW '06: Proceedings of the 15th International conference on WWW, May 2006, pp. 447-456.*

Memcached: A distributed memory object caching system, accessed Jul. 2009 at http://danga.com/memcached, 3 pages.
Adobe Labs—Pixel Bender, accessed Jul. 2009 at http://labs.adobe.com/technologies/pixelbender, 4 pages.
"Using Adobe Buzzword", dated May 2009, Adobe Systems Incorporated, 35 pages.
"Using Adobe Acrobat.Com", Adobe Acrobat.Com., dated May 2009, Adobe Systems Incorporated, 17 pages.
K. Gibbons, "Custom Printing with Flex, Part 2: Generating PDFs with AlivePDF," dated Mar. 1, 2009, 29 pages.
Pradeek's Weblog: AlivePDF Tutorial: How to create a PDF file with Flex/AIR, dated May 8, 2009, 5 pages.
A. Franz, Gravity Blast, "Creating PDF with images using flex and AlivePDF," dated Jul. 19, 2009, 13 pages.
D. Ortinau, "Generate PDFs with Actionscript using AlivePDF," dated May 8, 2008, 6 pages.
Document entitled "AlivePDF," accessed Jun. 2009 at http://www.alivepdf.org, 6 pages.
Document entitled "FPDF Library—PDF generator," accessed Jun. 2009 at http://www.fpdf.org, 1page.

* cited by examiner

*Primary Examiner* — Laurie Ries
(74) *Attorney, Agent, or Firm* — Fish & Richardson P.C.

(57) ABSTRACT

Methods, systems, and apparatus, including computer programs encoded on a computer storage medium, for exporting electronic documents in a rich internet application environment are described. In one aspect, a method includes generating a display object based at least in part on a rich internet application interpreting an application data object. The display object includes displayable features and non-displayable features associated with the displayable features. A rich internet application platform runs the rich internet application and includes an export resource adapted to be invoked by multiple different rich internet applications. The export resource receives the display object and identifies components of the display object and an arrangement of the components. The export resource generates an electronic document based at least in part on the identified components and the identified arrangement. The generated electronic document includes the displayable features and the non-displayable features.

20 Claims, 4 Drawing Sheets

EXPORTING ELECTRONIC DOCUMENTS FROM RICH INTERNET APPLICATIONS

BACKGROUND

This specification relates to exporting electronic documents in a rich internet application environment. A rich internet application platform on a client device can interpret application code to provide rich internet application functionality on the client device. For example, a rich internet application platform can interpret SWF files that include ActionScript code and/or other types of code (e.g. Pixel Bender code) for providing a rich internet application. Example rich internet application platforms include Adobe Flash and Adobe AIR. Adobe Flash can execute on a client device as a standalone application or within an installed software application (e.g., a browser application, a document reader application) to provide rich internet application functionality. Adobe AIR can execute in a desktop environment (e.g., provided by an operating system) to provide rich internet application functionality independent of a browser application. Rich internet applications can be developed, for example, using Adobe Flex programming and/or Adobe Flash programming products.

SUMMARY

This specification describes technologies relating to exporting electronic documents in a rich internet application environment.

In general, one innovative aspect of the subject matter described in this specification can be embodied in methods that include the actions of generating a display object based at least in part on a rich internet application interpreting an application data object formatted for the rich internet application. The display object defines displayable features of a first graphical representation of the application data object and non-displayable features associated with the displayable features. The rich internet application runs on a rich internet application platform on a client device. The rich internet application platform includes an export resource adapted to be invoked by a plurality of different rich internet applications. The export resource is invoked to identify components of the display object and an arrangement of the components. The export resource is invoked to generating an electronic document based at least in part on the identified components of the display object and the identified arrangement. The electronic document includes data for generating a second graphical representation that includes the displayable features of the first graphical representation and additional data defining the non-displayable features. Other embodiments of this aspect include corresponding systems, apparatus, and computer programs, configured to perform the actions of the methods, encoded on computer storage devices.

These and other embodiments can each optionally include one or more of the following features. Multiple additional display objects are generated based at least in part on the rich internet application interpreting the application data object. The export resource is invoked to identify additional components of the additional display objects and an arrangement of the additional components. The generated electronic document is based at least in part on the identified additional components. The export resource is invoked to generate multiple document objects based at least in part on the identified components. Each document object includes at least a portion of the data for generating the second graphical representation and at least a portion of the additional data. The generated electronic document includes the document objects. The export resource generates the electronic document by passing each of the identified components and information on the identified arrangement to a document object library and by receiving at least a portion of the electronic document from the document object library in response to the passing. Additional information relating to the displayable features of the application data object is identified by the rich internet application. The additional information and the display object are provided to the export resource. The electronic document is generate based at least in part on the additional information. The rich internet application platform includes an interpreter provided by a browser application. The interpreter interprets code having a first format, and the rich internet application includes a script having the first format. The data for generating the second graphical representation includes data for generating the second graphical representation in a device-independent format. A second display object is generated based at least in part on a second rich internet application interpreting a second application data object formatted for the second rich internet application. The second rich internet application runs on the rich internet application platform on the client device. The export resource is invoked to identify second components of the second display object and a second arrangement of the second components. The export resource is invoked to generate a second electronic document based on the identified second components of the second display object and the identified second arrangement. An export progress display is provided on a display device based at least in part on a progress notification passed from the export resource to the rich internet application.

Particular embodiments of the subject matter described in this specification can be implemented so as to realize one or more of the following advantages. A client device can use the document export tool to export data objects from multiple different rich internet applications to an electronic document format in a manner that preserves non-displayable features of the data object. For example, the export tool can export a data object formatted for any one of multiple different Adobe Flash applications to the Portable Document Format (PDF) in a manner that reduces or minimizes data loss. The export resource can interface with the Adobe Flash platform (and/or related application platforms), including all application programming interfaces (APIs) of the Flash platform. For example, in some implementations the export resource captures and converts Flash vector art to one or more PDF constructs. By providing the export tool on the client device, the use of network resources and/or the use of server application resources may be reduced. For example, generating a PDF document locally on a client device may reduce consumption of power, bandwidth, human resources (production support staff), and/or server equipment. The processing time required for document export may also be reduced. In some implementations, by providing the export tool within a rich internet application platform, the use of operating system resources and/or other computing resources on the client device may be reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
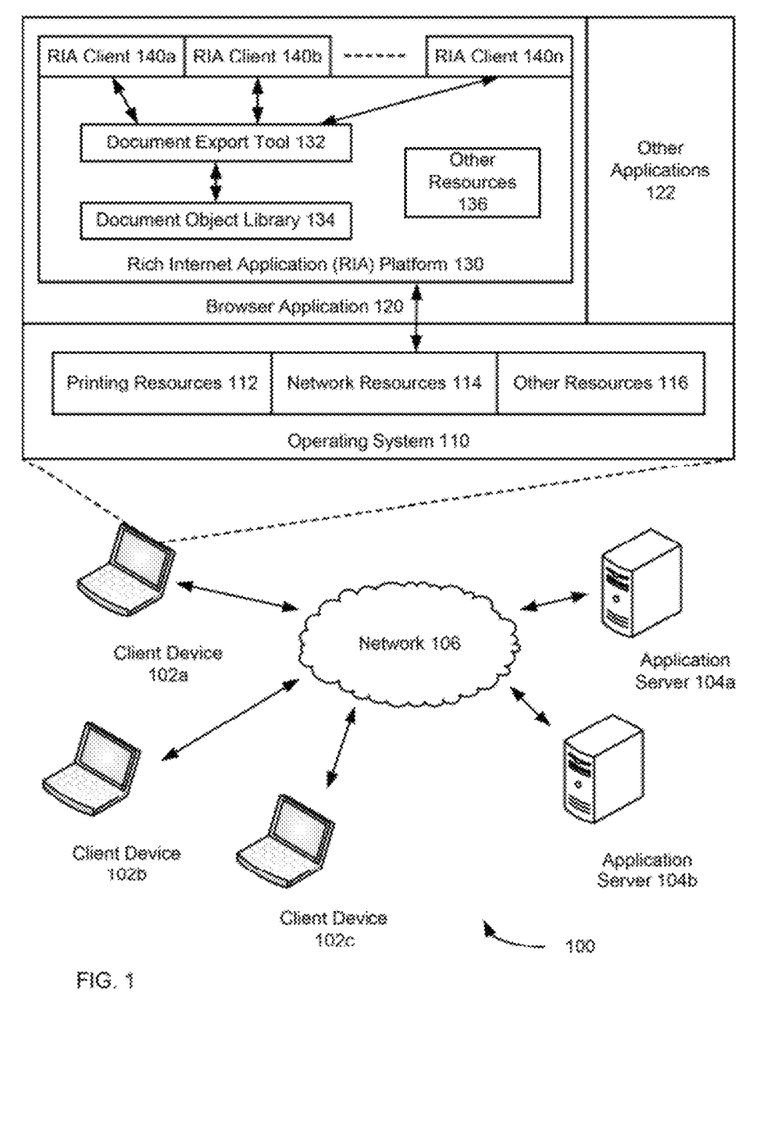
FIG. 1 is a block diagram showing an example system for exporting electronic documents from a rich internet application.

FIG. 1 is a block diagram showing an example system 100 for exporting electronic documents from a rich internet application. The system 100 includes client devices 102a, 102b, 102c and application servers 104a, 104b communicably coupled by a network 106. The client devices 102a, 102b, 102c can each include rich internet application clients that interact with server applications running on the application servers 104a, 104b. The client devices 102a, 102b, 102c can each use an application-independent document export tool to export data objects from a rich internet application to generate an electronic document in a manner that preserves non-displayable features of the data object. For example, the export tool can be invoked by multiple different rich internet applications to export a data object formatted for one of the rich internet applications to an electronic document format that includes hyperlinks, bookmarks, comments, multimedia, and other types of non-displayable data. The exported electronic document may include metadata (e.g., specifying an author, a client application, a document creation date, and/or other information) and/or structure information for the initial application data object. In a particular example, the export tool can export a data object formatted for any one of multiple different Adobe Flash applications to the Portable Document Format (PDF). As such, the export tool can serve as a versatile resource for multiple different client applications. By providing the export tool functionality on the client devices 102a, 102b, 102c, the use of network resources and/or server application resources may be reduced, and in some cases, the processing time required for document export may also be reduced. In some implementations, by providing the export tool within a rich internet application platform, the use of operating system resources and/or other computing resources on the client device may be reduced. Indeed, the export tool may be used on client devices (e.g., some handheld mobile devices) having operating systems that do not include printing resources. In addition, the export tool may be used on client devices where the operating system has printing resources that are not conveniently accessible to the client application due, for example, to version and/or vendor fragmentation of the operating system. As such, the export tool can function as a cross-platform resource.

The client device 102a includes an operating system 110 that manages software and/or hardware resources of the client device 102a. For example, the operating system 110 can access and/or control aspects of the memory or memories, processor(s), storage device(s), input/output device(s), network communication interface(s), and/or other hardware components that may be included in the client device 102a. In the example shown, the operating system 110 includes and/or has access to printing resources 112, network resources 114, and other resources 116. The other resources 116 may include file system resources that allow files and other data to be saved on the client device 102a. Also, the operating system 110 can load software applications and make the resources of the client device 102a (e.g., printing resources, network resources, memory resources, processing resources, and/or others) available to the loaded applications. In the example shown, the operating system 110 has loaded a browser application 120 and other applications 122. The operating system 110 can coordinate the allocation of resources among multiple applications loaded on the client device 102a. Example operating systems include Microsoft Windows, Mac OS, Unix, Linux, Sun OS, and others. In some implementations, the client device 102a is a handheld wireless device, and the operating system 110 may be implemented using iPhone OS, BREW, Java ME, Google Android, Palm WebOS, MS Windows Mobile, and/or another type of application platform for a mobile device.

The browser application 120 is an installed software application loaded by the operating system 110. The browser application 120 can communicate with a remote server and interpret a response received from the server. In some instances, the browser application 120 provides a graphical user interface based at least partially on the data received from the server. For example, the browser application 120 can send a request (e.g., a Uniform Resource Locator, or another type of request) to the server, interpret a response (e.g., a web page, or another type of response) received from the server, and display the interpreted response to a user. Example browser applications include Microsoft Internet Explorer, Mozilla Firefox, Google Chrome, Apple Safari, Opera, Opera mobile, Fennec, and others. In the example shown, the browser application 120 has loaded a rich internet application platform 130.

The rich internet application platform 130 includes a document export tool 132, a document object library 134, and other resources 136. The rich internet application platform 130 can run rich internet application clients. For example, the rich internet application platform 130 can include an ActionScript interpreter that interprets the ActionScript code of a rich internet application client. The rich internet application platform 130 may additionally or alternatively include an interpreter of one or more other languages (e.g., C, C++, Javascript, Adobe Pixel Bender, etc.). In some implementations, the rich internet application platform 130 can generate bytecode based at least in part on source code of a rich internet application. The rich internet application source code can include, for example, ActionScript code, Pixel Bender code, C code, C++ code, Javascript code, and/or others). The rich internet application platform 130 can include multiple interpreters. As an example, the rich internet application platform 130 can include a first interpreter for interpreting bytecode generated based on ActionScript and/or C++ source code and a second interpreter for interpreting bytecode generated based on Adobe Pixel Bender source code. In some instances, the rich internet application platform 130 can generate multimedia representations, interactive graphical user interfaces, animated graphic objects, and/or other types of output that can provide a rich user experience. The rich internet application platform 130 can function as a virtual machine. For example, the rich internet application platform 130 can provide resources to a rich internet application by emulating lower-level protocol layers, such as an operating system layer and/or physical layers. The rich internet application platform 130 can provide resources to a rich internet application through wrapping with a consistent cross-browser interface. The rich internet application platform 130 can facilitate communication between rich internet applications running on the platform 130 and one or more of the remote application servers 104a, 104b, for example, by utilizing the network resources 114 of the operating system 110.

The rich internet application platform 130 can be loaded by the web browser 120, for example, based on instructions in a web page. One example of a rich internet application platform 130 is the Adobe Flash platform. In some implementations the rich internet application platform 130 can run within another type of application (e.g., an installed application other than a browser). For example, a document reader application (e.g., Adobe Acrobat, and others) may include an embedded rich internet application platform. In alternative embodiments, the rich internet application platform 130 can be loaded directly by the operating system 110. As such, the rich internet application platform 130 can operate independent of a web browser application. One example of a rich internet application platform that can be loaded by an operating system is the Adobe AIR platform.

In the example shown, the rich internet application platform 130 has loaded multiple rich internet application clients 140a, 140b, etc. One or more of the rich internet application clients 140a, 140b, etc. can be delivered to the client device 102 over the network 106 upon use (e.g., each time the rich internet application client is accessed). One or more of the rich internet application clients 140a, 140b, etc. can be stored on the client device 102 for more permanent use (e.g., to be used multiple times). For example, an Adobe AIR application or a rich internet application embedded in a PDF document may be stored and used multiple times on the client device 102. A rich internet application can include one or more SWF files and/or other types of files that can be interpreted by an ActionScript interpreter. Example rich internet application clients include Adobe Buzzword (a web-based word processor), Adobe ConnectNow (a web-based meeting software), Acrobat.com Tables, Acrobat.com Presentations, and others. In some implementations, when the rich internet application platform is loaded on the operating system 110 rather than by an installed application, a rich internet application client runs as a standalone application, independent of the browser application 120.

In some cases, basic functionality of a rich internet application makes substantial use of both local execution of instructions on the client device and communications with an external server over the Internet or another type of data network. For example, a rich internet application may rely at least partially on one or more of the application servers 104a, 104b for data storage, data versioning, and/or data update distribution. As another example, a rich internet application may rely at least partially on one or more of the application servers 104a, 104b for functionality associated with data access control, data encryption, data authentication, presence data distribution, multi-user chat, video conferencing, multi-user collaboration, and/or other functions. Other aspects of a rich internet application may function independent of the external server, relying only on local execution of instructions on the client device. For example, a rich internet application typically generates a rich user interface based on local execution of instructions on the client device. As another example, a rich internet application can execute instructions locally to edit the content of an application data object, to interpret application data objects, to generate new application data objects and/or new elements of application data objects, and/or to perform other functions. While a rich internet application typically utilizes server interactions for some substantial aspects of its functionality, the rich internet application can provide a rich user experience. For example, a rich internet word processing application can allow a full range of word processing capabilities.

The rich internet application clients 140a, 140b, etc. can interpret application data objects and provide a graphical representation of an interpreted application data object. Each application data object can be formatted for a particular rich internet application client, and the rich internet application client can include instructions regarding how an application data object is to be rendered for graphical presentation. For example, the rich internet application can be a word processing application, and the application data object can be a word processing document formatted for the word processing application. As another example, the rich internet application can be a spreadsheet application, and the application data object can be a spreadsheet document formatted for the spreadsheet application. The rich internet application client can generate a display object based on the rich internet application client's interpretation of an application data object. The display object can be generated based at least partially on resources provided by the rich internet application platform 130. The display object can be passed to the document export tool 132 and/or to the operating system 110 for delivery to an output device such as a monitor or a printer.

The display object generated by the rich internet application client includes displayable features that define a graphical representation presented, for example, on a monitor or another output device. In addition to the displayable features, the display object can also include hyperlinks, bookmarks, comments, multimedia, and/or other types of non-displayable data specified by the application data object and interpreted by the rich internet application client. The non-displayable features define information that is not displayed when the display object is presented on an output device. For example, hyperlink data in the display object can be associated with displayable text in the display object, and the hyperlink data can include a URI (Uniform Resource Indicator), URN (Uniform Resource Name), URL (Uniform Resource Locator), and/or an address that is not displayed in a graphical representation of the display object. As another example, a comment or a bookmark in the display object can be associated with displayable text in the display object, and the comment or bookmark can include a text and/or other information that is not displayed in a graphical representation of the display object. In some cases, the non-displayable data can be displayed in response to a user's interaction with the displayable features. For example, clicking the displayable text associated with a hyperlink may cause the URI, URN, URL, or web address to be displayed. As another example, clicking a displayable icon, graphic, or text associated with a bookmark or a comment may cause the bookmark or comment data to be displayed. As another example, clicking a displayable icon, graphic, or associated text may cause a video to be played, a three-dimensional object to appear from a static two-dimensional flattened representation. In some cases, a hyperlink includes a reference to an embedded data object, rather than a URL. For example, a video can be fully embedded into an electronic document and associated with an action (e.g., a pointer click over an area of a page).

The document export tool 132 receives a display object generated by any of the rich internet application clients 140a, 140b, etc. and generates an electronic document that includes both the displayable features and the non-displayable features included in the display object. For example, the electronic document can include hyperlinks, bookmarks, comments, multimedia, and other types of non-displayable data according to the application data object interpreted by the rich internet application client. The rich internet application clients 140a, 140b, etc. generate display objects to provide information to a user through a display device. As such, the rich internet application clients 140a, 140b, etc. can generate display objects independent of a document export process. In some cases, the rich internet application clients 140a, 140b etc. typically do not need to be modified or augmented to generate the display objects that are received by the export tool 132.

The document export tool 132 receives a generic display object as its input, and the document export tool 132 can be invoked by any of the rich internet application clients 140a, 140b, etc., without any special application-dependent adaptations to the export tool 132. Some conventional modules require adaptations for each application that invokes the module. For example, an application invoking a conventional export module has to generate a particular type of data required by the module. As such, each application that invokes a conventional export module may have to be customized to interface with the conventional export module. A rich internet application client, in some cases, requires minimal or no modifications to be able to interface with the document export tool 132. The document export tool 132 can interface with multiple different rich internet application clients, which may reduce or eliminate the need for each rich internet application client (or a server-side application component) to include its own document export tool. For example, both the Acrobat.com Presentations client application and the Acrobat.com Tables client application can use the same instance of the document export tool 132 for exporting data objects to PDF.

The document export tool 132 executes within the rich internet application platform 130, which may reduce or minimize data loss and/or may reduce reliance on operating system resources. Some operating systems may not include resources (e.g., a printing stack) for performing document export. Some conventional export modules require processing by the operating system 110, which may lead to data loss (e.g., loss of non-displayable features). For example, a conventional technique that exports a document to PostScript format utilizes operating system resources and preserves displayable features of the display object. In some cases, using conventional operating system resources to export an electronic document rasterizes and flattens a document image, which leads to data loss. As such, the resulting PostScript document does not include at least a portion of the non-displayable features (e.g., audio, video, hyperlinks, etc.) specified in the application data object. In addition, the document export tool 132 running within the rich internet application platform 130 may eliminate the need for the operating system 110 to load and/or access a separate document export application (e.g., Acrobat Distiller). The document export tool 132 can be implemented as a plug-in feature, which can reduce the memory requirements for storing and/or executing the document export tool 132. In addition, the document export tool 132 can export an electronic document in a single-stage export process, which may in some cases be faster than a multi-stage export process. For example, the single-stage export process may generate a single electronic document rather than generating and refining multiple successive electronic documents.

The output of the export tool 132 can include an electronic document that stores both displayable and non-displayable data. The electronic document can be stored in a document format that allows a device-independent rendering of the document content. For example, the electronic document can be stored as a PDF document.

The export tool 132 can generate the output electronic document based on the display object received from the rich internet application by identifying a structure of the display object. For example, the export tool 132 can define the display object as a root node of a hierarchical object structure, and the export tool 132 can identify components of the display object and define each component as a node in the hierarchical object structure. As a particular example, the export tool 132 can identify document pages when the pagination is not predefined in the display object. As another example, the export tool 132 can identify text elements, graphic elements (e.g., shadings, patterns, transparencies, soft-masks, alpha channels, images, videos, three-dimensional shapes, etc.), and other types of displayable components of the display object. As a particular example, the export tool 132 can identify text runs in the display object, where each text run includes a section of displayable text having the same attributes (e.g., font size, font style, font face, font color, orientation, and/or others). Each text run can be incorporated into the hierarchical object structure defined by the export tool.

In addition to identifying the content of each component of the display object, the export tool 132 identifies a layout and/or arrangement of the components as they would appear in a graphical representation of the display object. For example, the export tool 132 can identify spatial coordinates and/or size, a spatial domain, and/or other properties that identify how the displayable components of the display object are arranged in a graphical representation of the display object. The export tool 132 can identify non-displayable features of the display object that are associated with an identified component. For example, if the export tool 132 identifies a displayable piece of text, the export tool 132 may identify a URI and/or other non-displayable hyperlink data associated with the displayable text.

The document export tool 132 provides an API (Application Programming Interface) that receives one or more display objects through the rich internet application platform. The API converts a received display object(s) to one or more corresponding document constructs (e.g., PDF constructs) using the document object library 134. For example, the API can receive a root display object and identify multiple components in a tree structure defined by the display object, and the document object library 134 can convert each of the identified components to a corresponding PDF construct. The document export tool 132 can provide an API through which one or more display objects can be exported to a multiple-page electronic document. The document export tool 132 can provide an API through which pagination of a display object can be identified, and the electronic document can be generated on a per-page basis. In some cases, the document export tool 132 receives pagination information. For example, the rich internet application 140 can provide page break information (e.g., specifying where one page of the electronic document ends and where another page begins), shrink-to-fit information (e.g., specifying a region to be scaled to fit on a page of the electronic document), and/or other types of pagination information.

The document object library 134, generates document objects based on the components of the display object identified by the export tool 132. For example, the document object library 134 can receive data describing one or more components of the display object identified by the export tool 132, and the document object library 134 can generate a document object that corresponds to the one or more components. The document object generated by the document object library 134 can include the non-displayable features of the display object. The document object generated by the document object library 134 can specify a spatial arrangement (e.g., a position and/or domain) of the document object based on the arrangement of the components identified by the export tool 132. As a particular example, the document object library 134 can receive a string of text along with formatting information and position information for the string of text, and the document object library 134 can generate a document object that incorporates the received text. In some instances, the document objects include PDF document objects. For example, the export tool 132 can receive the document objects generated by the document object library 134 and combine the received document objects to form one or more output PDF documents.

The export tool 132 and/or the library 134 may be customized to interface with a particular class of rich internet application clients. For example, the export tool 132 and/or the library 134 may be customized to interface with Adobe Flash and/or Adobe AIR applications. The rich internet application client that invokes the export tool 132 can receive progress notifications, and the rich internet application client can display the progress information to a user, for example, on a display device. In some cases, the rich internet application client can terminate the export of an object before the export process has completed. The rich internet application client may provide a graphical user interface that allows the user to cancel the export before the export process has completed, to pause and/or resume the export process, to run the export task in the background, and/or to select other options. In some implementations, additional information is provided to the export tool 132 along with the display object. For example, the additional information can be identified by the rich internet application client and provided to the export tool 132 in order to improve the quality of the exported electronic document. The additional information received by the export tool 132 can include visual or non-visual "hints" that indicate a type of export requested or required by the rich internet application client. The "hints" can be metadata, small functions, or interfaces implemented by the display object. For example, when embedding a video, a "hint" provided by the rich internet application client can indicate whether a video source URL should be put in the electronic document or whether the entire video source should be downloaded and embedded into the document. As another example, when embedding a video, a "hint" provided by the rich internet application client can identify what frame and/or time in the video should be considered as the poster frame or whether a completely different raster, image, or display object should be used as the default poster frame. (A poster-frame is displayed when video is not playing.) As another example, "hints" can indicate how multiple display objects and/or multiple parts of a display object related to one another. As another example, "hints" can identify a portion of text as a header, a footer, or another type of text, so that the portion of text can be marked as an artifact in the exported electronic document, so that an accessibility device does not read the portion of text aloud, and/or so that the portion of text is properly handled by further export processing and/or document conversion. Using "hints" may also help avoid a multi-stage document export process. For example, the additional information provided by the rich internet application client may be provided before a document export process to avoid or reduce subsequent post-processing of an exported electronic document. The export tool 132 and/or the library 134 can be implemented as a SWF file. The export tool 132 and/or the library 134 can be downloaded on a client device and used multiple different times. For example, the export tool 132 and/or the library 134 can be stored in the cache of a browser or stored permanently on the client device. The export tool 132 and/or the library 134 can be downloaded upon use and/or upon a need at the client device. After the export tool 132 and/or the library 134 has been downloaded, it may be invoked by any one of multiple different rich internet application clients without requiring an additional download of the export tool and/or library.

In one aspect of operation, the client device 102a receives one or more web pages from the application server 104a. The browser application 120 interprets the web page(s) and loads the rich internet application platform 130 based on the information in the web page(s). The browser application 120 retrieves a rich internet application client 140a from the application server 104a based on the information in the web page (s). The rich internet application client 140a is interpreted by the rich internet application platform 130. The rich internet application client 140a running on the rich internet application platform 130 retrieves an application data object from the application server 104a, interprets the application data object, and generates a display object based on the interpretation. The display object is passed to the document export tool 132. The document export tool 132 identifies components of the display object and an arrangement of the components. The document export tool 132 generates an electronic document based on the identified components and the identified arrangement. Generation of the electronic document is facilitated by the document object library 134 and is performed in a manner that preserves any non-displayable features of the display object.

Generally, the system 100 can include a different number of client devices and/or a different number of application servers, and the network 106 can include at least a portion of multiple different data networks. Some aspects of the system 100 can be implemented on an enterprise scale or a web scale, allowing the system 100 to accommodate client devices, network resources, and application servers for hundreds, thousands, or more users. The system 100 can utilize a content distribution network (e.g., Akamai and/or other types) that can serve the export tool 132 to a client device in an easy and fast manner. The export tool 132 can be a static file (e.g., a SWF) until it is loaded by the client application.

Figure 2:
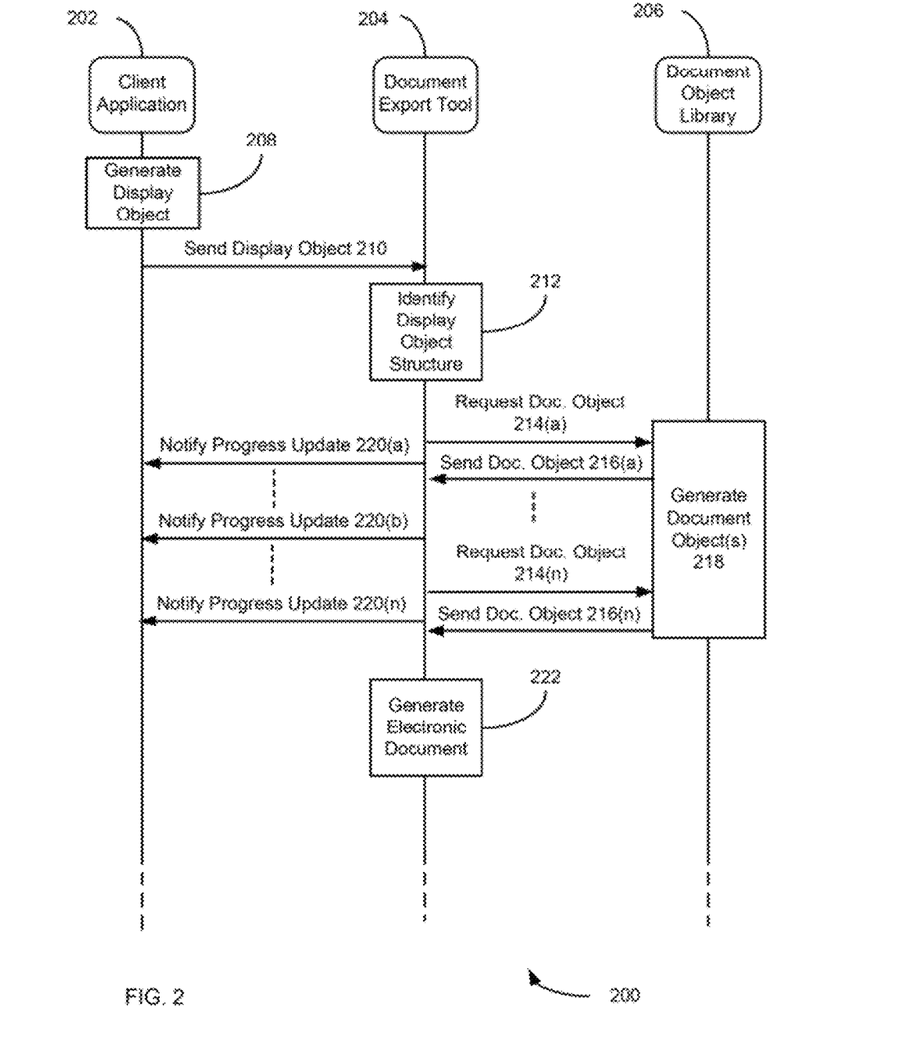
FIG. 2 is a signaling and flow diagram showing example operations and interactions in a system for exporting electronic documents from a rich internet application.

FIG. 2 is a signaling and flow diagram showing example operations and interactions in a system 200 for exporting electronic documents from a rich internet application. For example, the operations and interactions shown in FIG. 2 can be used to export an application data object to a PDF document in a rich internet application platform. The PDF document can be exported based on a rich internet application's interpretation of the application data object.

The system 200 includes a client application 202, a document export tool 204, and a document object library 206. The client application 202, the document export tool 204, and the document object library 206 may each be implemented as one or more software modules on a client device. For example, the client application 202 can be the rich internet application client 140a of FIG. 1, the document export tool 204 can be the document export tool 132 of FIG. 1, and the document object library 206 can be the document object library 134 of FIG. 1. The system 200 can include one or more additional client applications, and the document export tool 204 can be adapted to interact with each of the client applications. For example, in some implementations the document export tool 204 can be adapted to receive a display object and generate an output based on the received display object with no further input from the client application. Some example operations and interactions in the system 200 are shown in FIG. 2. The operations and interactions shown may be performed in the order shown and/or in a different order. Additional and/or different operations and interactions may be also performed in the system 200.

The client application 202 obtains an application data object formatted for the client application 202. For example, the application data object can be received from a server, generated locally, or a combination of these. At 208, the client application 202 generates a display object based at least in part on the client application 202 interpreting the application data object. The display object defines displayable features of a graphical representation of the application data object and non-displayable features associated with the displayable features. At 210, the client application 202 sends the display object to the document export tool 204. For example, the client application 202 may receive a user request to export the application data object to PDF document format. At 212, the document export tool 204 identifies a structure of the display object. For example, the document export tool 204 may identify pages of the display object, text components of the display object, graphic components of the display object, other types of components, and an arrangement of the components. The document export tool 204 may define a hierarchical object structure based at least partially on the detected components. In some embodiments, the rich internet application client does not automatically provide information about vector shapes that have been drawn as part of a display object. In such cases, a wrapper can record some or all of the vector shapes and pass the vector shape data to the export tool along with the display object. The wrapper can provide vector graphic data without significant CPU time or memory requirements. The recording can be made either by creating a new display object, by redrawing an existing display object, and/or in another manner.

At 218, the document object library 206 generates requested document objects based on data received from the document export tool 204. The document objects are generated in an asynchronous manner, temporarily returning control to the client application 202 at multiple time intervals. For example, asynchronous execution may allow the client application 202 to receive progress updates and/or allow the client application to kill or pause the export process. As such, a user of the client application 202 may also be provided a graphical interface that informs the user of progress and/or allows the user to cancel the export process. In addition, executing asynchronously may allow the document export tool 204 to operate seamlessly in a rich internet application environment. For example, by returning control back to the client application 202 after a certain number of operations, the document export tool 204 may avoid exceeding a time limit specified by the rich internet application platform.

In the example shown in FIG. 2, the asynchronous execution of the document export process involves multiple iterations of data exchange between the document export tool 204 and the document object library 206, and the passing of progress updates from the document export tool 204 to the client application 202. At multiple instances (214(a) . . . 214(n)) during the sub-process 218, the document export tool 204 requests a document object from the document object library 206. As such, the document export tool 204 can send data to the document object library 206, and the document object library can generate the requested document object based at least in part on the receive data. At multiple instances (216(a) . . . 216(n)) during the sub-process 218, the document object library 206 responds to the document export tool 204 by sending the generated document objects, a status code, and/or other information to the document export tool 204. In some cases, the document object library 206 does not send multiple responses 216, but rather only sends a single response that includes the full exported electronic document. In such cases, an absence of error messages from the document object library 206 may imply that the requested document objects have been created. In addition, at multiple instances (220(a), 220(b) . . . 220(n)) during the sub-process 218, the client application 202 notifies the client application 202 of progress.

At 222, the document export tool 204 generates an electronic document based at least in part on the document objects received from the document object library 206. For example, the document export tool 204 can combine the document objects received from the document object library 206, in some cases with additional data, to generate an output electronic document. Alternatively, the document export tool can request that the document object library 206 provide the exported electronic document. In some cases, document object library 206 can perform a global optimization of the generated output document. For example, during the sub-process 218 and/or at the end of the sub-process 218 the document object library 206 can optimize the exported electronic document based on a collection of multiple generated document objects. The output electronic document can be a PDF document or another type of electronic document. The output electronic document includes data for generating a graphical representation that includes the displayable features of the display object generated at 208. The output electronic document includes additional data defining the non-displayable features of the display object generated at 208.

Figure 3:
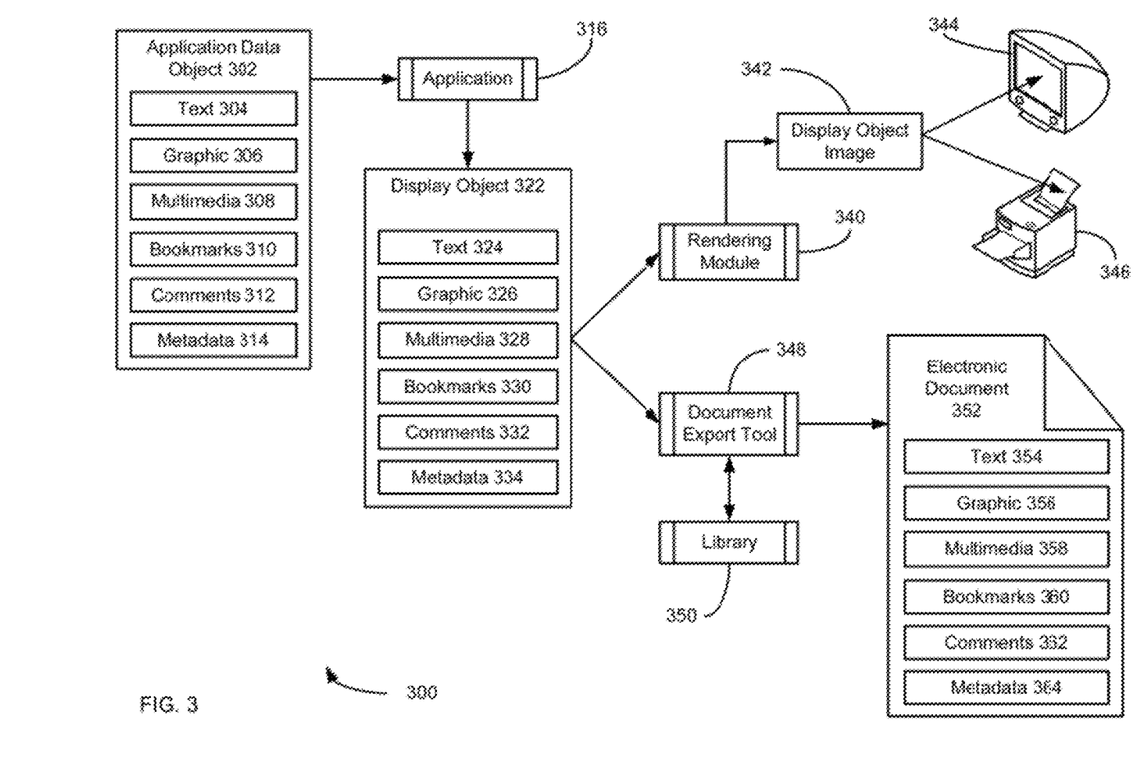
FIG. 3 is a block diagram showing an example process flow for exporting an electronic document from a rich internet application.

FIG. 3 is a block diagram showing an example process 300 for exporting an electronic document from a rich internet application. The process 300 can be used to generate an electronic document based on a rich internet application interpreting an application data object. The process 300 can preserve non-displayable features of the initial application data object, so that the resulting electronic document includes the non-displayable features as well as the displayable features of the initial application data object. For example, if the initial application data object defines text, graphics, images, hyperlinks, comments, bookmarks, audio data, transparency information, animation, and/or video, the process 300 can generate a display object and an electronic document that include all of these features. In some examples, the generated electronic document is a PDF document.

The process 300 involves multiple data objects and multiple processing modules. The data objects include an application data object 302, a display object 322, a display object image 342, and an electronic document 352. The processing modules include a client application 316, a rendering module 340, a document export tool 348, and a library 350. At a high level, the application 316 generates the display object 322 based on the application data object 302, and the document export tool 348 generates the electronic document 352 based on the display object 322. The library 350 provides support to the document export tool 348 to facilitate generating the electronic document 352. In some cases, the rendering module 340 can generate an image 342 of the display object for output on a monitor 344 and/or a printer 346. The rendering module 340 can include components of a rich internet application platform and/or components of an operating system. The example process 300 can be implemented using one or more of the software and/or hardware components of the system 100 of FIG. 1 and/or the system 200 of FIG. 2. For example, the application 316 can be one of the rich internet application clients 140a, 140b, . . . 140n of FIG. 1, the rendering module 340 can include components of the rich internet application platform 130 and/or components of the operating system 110 of FIG. 1, the document export tool 348 can be the document export tool 132 of FIG. 1, and/or the library 350 can be the document object library 134 of FIG. 1.

The application data object 302 can be formatted according to an object schema for the application 316. The object schema can define classes of object elements, and the application data object 302 can include instances of the object elements. The object elements can be organized, for example, in a hierarchical structure in the data object 302. Example application data objects include a word processing document formatted for a word processing software application, a spreadsheet document formatted for a spreadsheet application, and others.

The application data object 302 can include a data stream and metadata 314. The data stream can include text data 304, graphic data 306, multimedia data 308, bookmarks 310, comments 312, and/or other types of content. The data stream can include hyperlink data and other types of non-displayable information. For example, hyperlink data may specify a web address, a memory location, and/or an element of a data object. The hyperlink data can be associated with displayable data (e.g., a piece of text, a portion of an image, a graphic object, etc.) and allow a user to perform an action (e.g., click on the associated displayable data, or another action) and navigate directly to the address, location, or element specified by the hyperlink data.

The text data 304 can include any type of alphanumerics and/or symbols defined by a character set or an alphabet. The text data 304 can also include formatting information defining how and/or where the alphanumerics and/or symbols appear in a graphical representation of the application data object 302. For example, the application 316 can interpret the text data 304 and generate a graphical representation of the text data 304.

The graphic data 306 can include raster images, vector graphics, and/or other types of graphic information. For example, the graphic data 306 can include Bitmap data, JPEG data, TIFF data, SVG data, and/or other graphic data formats. In some cases, the graphic data 306 is stored as one or more separate files, and the application data object 302 includes a reference to the graphic data file(s). The graphic data 306 can also include additional information defining how and/or where the graphics appear in a graphical representation of the application data object 302. The graphic data 306 can also include transparency information specifying one or more colors to appear transparent in a graphical representation of the application data object 302. The graphic data 306 can include a mask for a graphic object (e.g., a soft-clip mask leading to vignette style of visual display, a hard-clip mask leading to stencil type of clipping).

The multimedia data 308 can include audio data, movie data, motion graphic data, and/or other types of multimedia data. For example, the multimedia data 308 can include MP3 data, WAV data, SWF data, H.264 data, FLV data, F4V data, MOV data, MPEG data, and/or others. The multimedia data 308 can include data formatted for a media player, for example, Adobe Flash Player, QuickTime, Windows Media Player, iTunes, or another type of media player. In some cases, the multimedia data 308 is stored as one or more separate files, and the application data object 302 includes a reference to the multimedia file(s). The multimedia data 308 can also include additional information defining how and/or where the multimedia data is presented in a graphical (and in some cases audio) representation of the application data object 302.

The bookmarks 310 can include identifiers and/or descriptions of one or more components and/or locations in the application data object 302. For example, a bookmark can be associated with a particular component or location in the application data object 302 (e.g., page, paragraph, figure, heading, chapter, cell, worksheet, slide, graphic object, frame, etc.), and the bookmark can include a brief description or label for the associated component or location. For example, in some implementations, the application 316 can interpret the bookmarks 310 and allow a user to navigate to the object component or location associated with each bookmark.

The comments 312 can include text, audio, and/or video comments, notes, bubbles, and/or shapes for pop-up information associated with the application data object 302. The comments 312 can include text entered by an author or a reviewer of the application data object 302. The comments 312 can also include additional data, such as an identification of a user who entered the comment, a date when the comment was entered, and/or other data. In some implementations, the application 316 can interpret the comments 312 and present the comments in (or alongside) a graphical representation of the application data object 302 along with metadata.

The one or more display objects 322 generated by the application 316 include the displayable and non-displayable features of the application data object 302. In the example shown, the display object 322 includes text data 324, graphic data 326, multimedia data 328, bookmarks 330, comments 332, metadata 334, hyperlink data, and/or other types of content. The display object 322 can be formatted as a standard or generic display object, for example, for output to a display device. As such, the format of the display object 322 is independent of the application 316 that generates the display object 322. The rendering module 340 can convert all or part of the display object 322 to an image 342 that does not include the non-displayable features of the display object 322, and the resulting image 342 can be delivered to the monitor 344 or the printer 346 for output. As another example, the rendering module 340 can convert all or part of the display object to a PostScript document that does not include the non-displayable features of the display object 322. In these examples, processing by the operating system may result in data loss.

The electronic document 352 generated by the document export tool 348 includes the displayable and non-displayable features of the display object 322. In the example shown, the electronic document 352 includes text data 354, graphic data 356, multimedia data 358, bookmarks 360, comments 362, metadata 364, hyperlink data, logical document structure, and/or other types of content. The electronic document 352 can be formatted as a PDF document, for example, for storage in a memory. The document export tool 348 can convert all or part of the display object 322 to an electronic document 352 that includes the non-displayable features of the display object 322, and the resulting electronic document 352 can be interpreted by a document reader (e.g., Adobe Acrobat Reader, or another type of software). The document reader can generate a graphical representation based on the electronic document 352, where the graphical representation includes the displayable features corresponding to the displayable features of the display object 322. The appearance and/or layout of the displayable features in the graphical representation of the electronic document 352 may be similar or identical to the appearance and/or layout of the displayable features in the graphical representation of the document object 322. The document reader can interpret the non-displayable features of the electronic document 352 and provide the functionality associated with the non-displayable features. For example, the document reader can interpret hyperlinks, bookmarks, comments, multimedia, and/or other types of non-displayable data. An electronic document may, but need not, correspond to a file. A document may be stored in a portion of a file that holds other documents, in a single file dedicated to the document in question, or in multiple coordinated files.

The generated electronic document 352 may include logical structure information describing a structure of the data object 302. The structure information may be required if the generated electronic document 352 needs to be further consumed by an accessibility-relying device. For example, the structure information may allow compliance with information accessibility laws, such as Section 508 of the Rehabilitation Act (29 U.S.C. §794d). Including the structure information in a PDF document may also be useful for converting the PDF document to another document format (e.g., Rich Text File, MS Word Document, HTML, etc.). Including the structure information in a PDF document may also allow the PDF to be read on a small device, such as a handheld mobile device, an electronic book reader, and/or other devices. Including the structure information in a PDF document may also allow paragraphs of text, pagination, and/or other aspects of document content to be re-layed out. For example, the document can be "reflowed" to fit a particular device screen size, A4 page size, letter page size, and/or others.

The techniques described herein may be implemented by a computing device configured to provide the functionality described. In various embodiments, a computing device may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Figure 4:
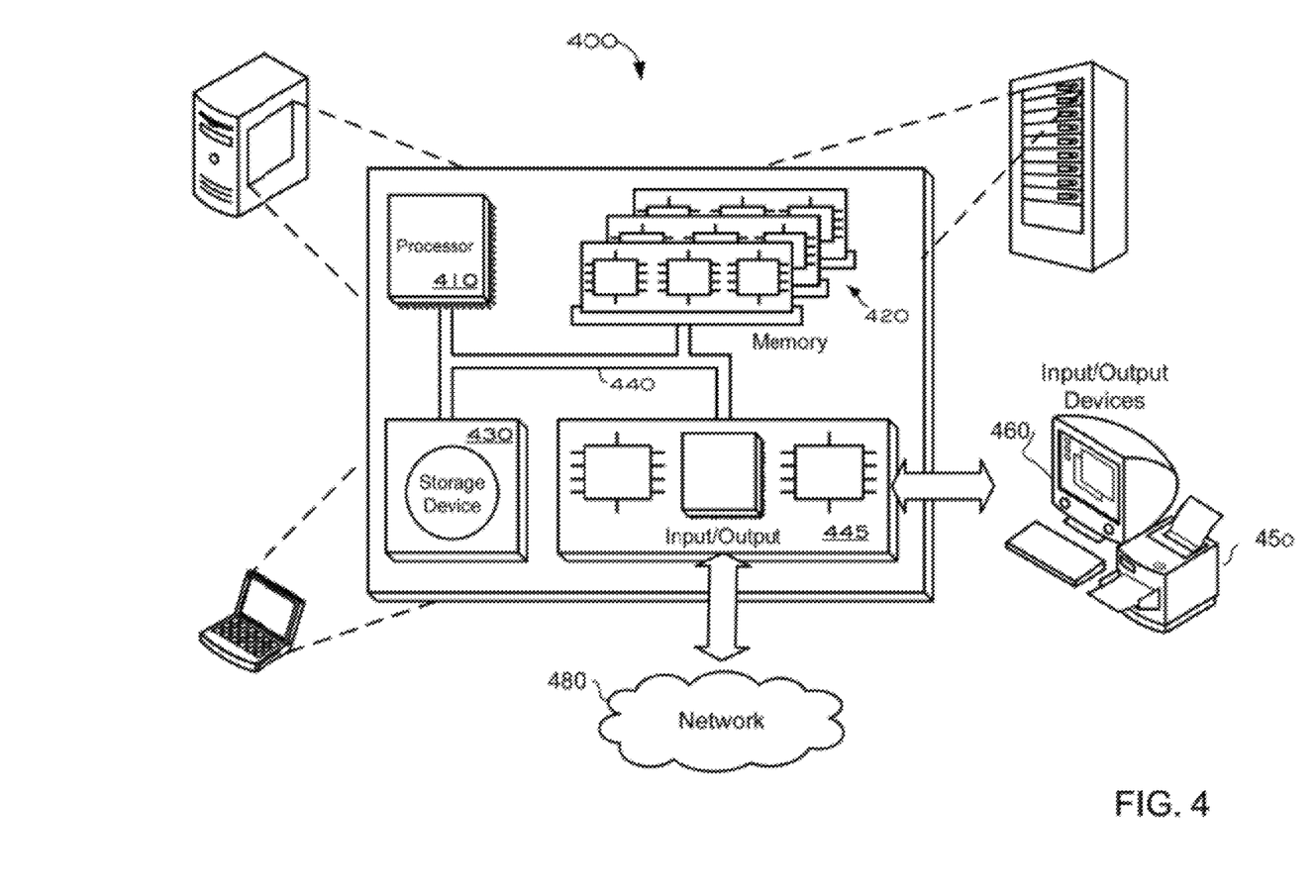
FIG. 4 is a block diagram showing an example computing device.

FIG. 4 is a block diagram showing an example computing device 400. In some instances, the example computing device 400 can function as a client device (such as the client device 102a of FIG. 1), as a server device (such as the server device 104a of FIG. 1), and/or as another type of device. For example, the computing device 400 can function as a client device running one or more rich internet applications that invoke an export module to export an electronic document. As another example, the computing device 400 can function as a server device running one or more server applications that provide support to a rich internet application client running on a remote client device.

The example device 400 includes a processor 410, a random access memory (RAM) 420, a storage device 430 (e.g., a writable read-only memory (ROM) and/or another type of storage device), and an input/output (I/O) controller 445 coupled by a processor (CPU) bus 440. The system 400 can be preprogrammed and/or it can be programmed (and reprogrammed) by loading a program from another source (e.g., from a CD-ROM, from another computer device through a data network, and/or in another manner). The I/O controller 445 is coupled to input/output devices 450, 460 and to a network 480. The input/output devices shown include a monitor 450 and a printer 460. Additional, fewer, and/or different input/output devices may be included. The devices 450, 460 receive and transmit data (e.g., stills, pictures, movies, and other data) in analog or digital form over communication links such as a serial link, wireless link, parallel link, and/or another type of link. The network 480 can include any type of data communication network. For example, the network 480 can include a wireless and/or a wired network, a Local Area Network (LAN), a Wide Area Network (WAN), a private network, a public network (such as the Internet), a WiFi network, and/or another type of data communication network.

The memory 420 and/or the storage device 430 can store instructions (e.g., computer code) associated with an operating system, computer applications, and/or other resources. The memory 420 and/or the storage device 430 can also store application data and data objects that can be interpreted by one or more applications and/or virtual machines running on the device 400. The processor 410 can execute instructions, for example, to generate output data based on data inputs. As one particular example, the processor 410 can generate an electronic document (e.g., a PDF document) based on a rich internet application interpreting an input data object. In examples where the device 400 is a client device running a rich internet application, the input/output controller 445 can send messages from the rich internet application to a remote server through the network 480, and the input/output controller 445 can receive responses from the remote server and/or from another device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. A back-end component can include a server cluster with one or more load balancers, application servers, content distribution networks, and/or other features. The middleware components can include a distributed file system, storage system, a memory caching layer (e.g., memcached, or another), and/or other features. The components of the system can be interconnected by any form or medium of digital data communication, e.g., a communication network.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page, a SWF file, and/or another type of data) to a client device. Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   running a rich internet application on a rich internet application platform at a client device, the rich internet application platform having an export resource that is compatible with the rich internet application and a plurality of other rich internet applications;

generating a display object based at least in part on the rich internet application interpreting an application data object formatted for the rich internet application, the display object defining displayable features of a first graphical representation of the application data object and non-displayable features associated with the displayable features; and exporting the display object to a document format using the export resource, wherein exporting the display object includes:

identifying components of the display object and an arrangement of the components; and generating an electronic document having the document format based at least in part on the identified components of the display object and the identified arrangement, the electronic document including data that, when interpreted by a document reader application, generate a second graphical representation that includes the displayable features of the first graphical representation and additional data defining the non-displayable features.

2. The method of claim 1, further comprising:

generating a plurality of additional display objects based at least in part on the rich internet application interpreting the application data object; and exporting the additional display objects to the document format using the export resource, wherein exporting the additional display objects includes identifying additional components of the additional display objects and an arrangement of the additional components, and wherein the electronic document is generated based at least in part on the identified additional components.

3. The method of claim 1, wherein the export resource performs operations including:

generating a plurality of document objects based at least in part on the identified components, each document object including at least a portion of the data that generate the second graphical representation and at least a portion of the additional data, the generated electronic document including the plurality of document objects.

4. The method of claim 1, wherein the export resource generates the electronic document by:

sending each of the identified components and information on the identified arrangement to a document object library; and receiving at least a portion of the electronic document from the document object library.

5. The method of claim 4, further comprising:

identifying additional information relating to the displayable features of the application data object; and providing the additional information and the display object to the export resource, wherein the electronic document is generated based at least in part on the additional information.

6. The method of claim 1, wherein the rich internet application platform comprises an interpreter provided by a browser application, the interpreter adapted to interpret code having a first format, the rich internet application comprising a script having the first format.

7. The method of claim 6, wherein the data that generate the second graphical representation includes data that generate the second graphical representation in a device-independent format.

8. The method of claim 1, further comprising:

generating a second display object based at least in part on a second rich internet application interpreting a second application data object formatted for the second rich internet application, the second rich internet application running on the rich internet application platform on the client device; and exporting the second display object to the document format using the export resource, wherein exporting the second display object includes:

identifying second components of the second display object and a second arrangement of the second components; and generating a second electronic document based on the identified second components of the second display object and the identified second arrangement.

9. A computer storage medium encoded with a computer program, the program comprising instructions that when executed by data processing apparatus cause the data processing apparatus to perform operations comprising:

running a rich internet application on a rich internet application platform, the rich internet application platform having an export resource that is compatible with the rich internet application and a plurality of other rich internet applications;

generating a display object based at least in part on the rich internet application interpreting an application data object formatted for the rich internet application, the display object defining displayable features of a first graphical representation of the application data object and non-displayable features associated with the displayable features; and exporting the display object to a document format using the export resource, wherein exporting the display object includes:

identifying components of the display object and an arrangement of the components; and generating an electronic document based at least in part on the identified components of the display object and the identified arrangement, the electronic document including data that, when interpreted by a document reader application, generate a second graphical representation that includes the displayable features of the first graphical representation and additional data defining the non-displayable features.

10. The computer storage medium of claim 9, wherein the rich internet application platform comprises a virtual machine.

11. The computer storage medium of claim 9, wherein the rich internet application includes bytecode generated from source code, the source code formatted as at least one of C code, C++ code, ActionScript code, or Pixel Bender code, and the rich internet application platform includes at least one interpreter that interprets the bytecode.

12. The computer storage medium of claim 9, wherein the rich internet application platform runs within a browser application.

13. The computer storage medium of claim 9, wherein the rich internet application comprises at least one SWF file and the electronic document comprises at least one Portable Document Format file.

14. The computer storage medium of claim 9, wherein the export resource is invoked to generate a plurality of document objects based at least in part on the identified components, each document object including at least a portion of the data that generate the second graphical representation and at least a portion of the additional data, the generated electronic document including the plurality of document objects.

15. The computer storage medium of claim 9, wherein the rich internet application platform further comprises a document object library, and generating the electronic document comprises:
- sending each of the identified components and information on the identified arrangement to the document object library; and
- receiving at least a portion of the electronic document from the document object library.

16. The computer storage medium of claim 9, the operations further comprising:
- generating a second display object based at least in part on a second rich internet application interpreting a second application data object formatted for the second rich internet application, the second rich internet application running on the rich internet application platform; and
- exporting the second display object to the document format using the export resource, wherein exporting the second display object includes:
  - identifying second components of the second display object and a second arrangement of the second components; and
  - generating a second electronic document based at least in part on the identified second components and the identified second arrangement.

17. A system comprising:
- a client device including a processor operable to perform operations of a rich internet application running on a rich internet application platform, the rich internet application platform having an export resource adapted to be invoked by the first rich internet application and a plurality of other rich internet applications, the operations of the rich internet application including:
  - generating a display object by interpreting an application data object formatted for the rich internet application, the display object defining displayable features of a first graphical representation of the application data object and non-displayable features associated with the displayable features; and
  - exporting the display object to a document format using the export resource, wherein exporting the display object includes:
    - identifying components of the display object and an arrangement of the components; and
    - generating an electronic document based at least in part on the identified components of the display object and the identified arrangement, the electronic document including data that, when interpreted by a document reader application, generate a second graphical representation that includes the displayable features of the first graphical representation and additional data defining the non-displayable features.

18. The system of claim 17, wherein exporting the display object comprises indirectly invoking the export resource by sending data to the rich internet application platform.

19. The system of claim 17, further comprising a server device including a processor that performs operations of a server application in response to requests received from the rich internet application.

20. The system of claim 17, wherein the processor is operable to run a second rich internet application on the rich internet application platform, the operations of the second rich internet application including:
- generating a second display object by interpreting a second application data object formatted for the second rich internet application; and
- exporting the second display object to the document format using the export resource, wherein exporting the second display object includes:
  - identifying second components of the second display object and a second arrangement of the second components; and
  - generating a second electronic document based at least in part on the identified second components and the identified second arrangement.

* * * * *